US009218266B2

(12) United States Patent
Dhanapal et al.

(10) Patent No.: US 9,218,266 B2
(45) Date of Patent: Dec. 22, 2015

(54) SYSTEMS AND METHODS FOR REPLICATION OF TEST RESULTS IN A NETWORK ENVIRONMENT

(71) Applicant: Infosys Limited, Bangalore (IN)

(72) Inventors: Karthikeyan Balaji Dhanapal, Chennai (IN); Harsha Siddaramappa, Bangalore (IN); Sanjoy Paul, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/946,776

(22) Filed: Jul. 19, 2013

(65) Prior Publication Data

US 2014/0026123 A1   Jan. 23, 2014

(30) Foreign Application Priority Data

Jul. 23, 2012 (IN) .......................... 3011/CHE/2012

(51) Int. Cl.
| | |
|---|---|
| G06F 9/44 | (2006.01) |
| G06F 11/36 | (2006.01) |
| H04L 12/24 | (2006.01) |
| H04L 12/26 | (2006.01) |

(52) U.S. Cl.
CPC .......... *G06F 11/3664* (2013.01); *H04L 41/069* (2013.01); *H04L 41/0686* (2013.01); *H04L 41/5038* (2013.01); *H04L 43/50* (2013.01)

(58) Field of Classification Search
CPC .................................. G06F 11/3664
USPC ................................ 717/124–135
See application file for complete search history.

(56) References Cited

U.S. PATENT DOCUMENTS

| 6,272,450 | B1 | 8/2001 | Hill et al. | |
|---|---|---|---|---|
| 6,742,141 | B1 * | 5/2004 | Miller | 714/26 |
| 7,747,249 | B2 | 6/2010 | Guo et al. | |
| 8,001,532 | B1 * | 8/2011 | Jakubiak et al. | 717/125 |
| 8,473,919 | B2 * | 6/2013 | Cutler | 717/128 |
| 2002/0016937 | A1 * | 2/2002 | Houh | 714/43 |
| 2002/0152305 | A1 * | 10/2002 | Jackson et al. | 709/224 |
| 2003/0112800 | A1 * | 6/2003 | Grech et al. | 370/389 |
| 2003/0145039 | A1 * | 7/2003 | Bonney et al. | 709/202 |

(Continued)

OTHER PUBLICATIONS

Pfahl, Dietmar, et al. "Evaluating the learning effectiveness of using simulations in software project management education: results from a twice replicated experiment." Information and Software Technology 46.2 (2004), pp. 127-147.*

(Continued)

*Primary Examiner* — Satish Rampuria
(74) *Attorney, Agent, or Firm* — LeClairRyan, a Professional Corporation

(57) ABSTRACT

Systems and methods for replication of test results in a network environment are disclosed. Methods described may include recording network traffic in a first instance of a test case by a network emulator node emplaced in the network environment, recording a time at which a connection open at the network emulator node completes a communication task, and deriving an order of task completion for each extant open connection thereby, and detecting the occurrence of one or more events, such as a packet drop, a packet retransmission, or a packet delay, among other events. Replication, as described, additionally involves recording the nature of the event and identification information associated with the packet to which the event is detected to have occurred; and associating the one or more events with each of the packets recorded, on the basis of the identification information and event recording.

21 Claims, 4 Drawing Sheets

(56) References Cited

U.S. PATENT DOCUMENTS

| | | | |
|---|---|---|---|
| 2003/0156548 A1* | 8/2003 | Sapp | 370/252 |
| 2005/0137838 A1 | 6/2005 | Medlyn | |
| 2007/0226483 A1* | 9/2007 | Cox et al. | 713/151 |
| 2011/0305150 A1* | 12/2011 | Haver et al. | 370/252 |
| 2014/0123111 A1* | 5/2014 | Lee et al. | 717/124 |

OTHER PUBLICATIONS

Briand, Lionel C., Tristen Langley, and Isabella Wieczorek. "A replicated assessment and comparison of common software cost modeling techniques." Proceedings of the 22nd international conference on Software engineering. ACM, 2000, pp. 377-386.*

Andersson, Carina, and Per Runeson. "A replicated quantitative analysis of fault distributions in complex software systems." Software Engineering, IEEE Transactions on 33.5 (2007), pp. 273-286.*

Spirent AirAccess, "AirAccess Wireless Network Emulators," retrieved from http://www.spirent.com/Solutions-Directory/AirAccess.aspx on Jul. 18, 2013.

Satoh, M., "A Testing Framework for Mobile Computing Software," IEEE Transactions on Software Engineering, 29:12, pp. 1112-1121 (2003).

Puzar, M. et al., "NEMAN: A Network Emulator for Mobile Ad-Hoc Networks," Technical Report #321, ISBN 82-7368-274-9, Department of Informatics, University of Oslo, pp. 1-7 (2005).

Andrew P., "Mobile Web and App Development Testing and Emulation Tools", Speckyboy, Apr. 12, 2010, <http:// speckyboy.com/author/apaulandrew/>.

Carson, M., "Application and Protocol Testing through Network Emulation", Internetworking Technologies Group, Nist, Sep. 1997, pgs. 1-3.

InterWorking Labs, "InterWorking Labs featured at the Darpa Robotics Challenge Finals", InterWorking Labs, Maxwell Pro Network Emulator, last accessed Aug. 14, 2015 <http://maxwell.iwl.conn/?gclid=ClyHlfSWIqYCFYsBHAodX0GC9g>.

Keynote, "Mobile Testing, Real Devices", Keynote, last accessed Aug. 14, 2015 <http://www.deviceanywhere.com/?gclid=C076kfGWIqYCFQwDHAodhjfxVg>.

Nomor Research, "Experience the future with Nomor Research", Nomor Research, last accessed Aug. 14, 2015 <http://www.nomorde/home/solutions-and-products/products/application-tester>.

* cited by examiner

SYSTEMS AND METHODS FOR REPLICATION OF TEST RESULTS IN A NETWORK ENVIRONMENT

This application claims the benefit of Indian Patent Application Filing No. 3011/CHE/2012, filed Jul. 23, 2012, which is hereby incorporated by reference in its entirety.

FIELD

The invention relates generally to the replication of a test case in a network environment. In particular, the invention relates to the reproduction of test results in the testing of mobile application behavior across a variety of network scenarios.

BACKGROUND

Recent years have seen a surge in the number and diversity of wireless and mobile network applications. A key differentiator among such applications may rest in their ability to deliver a consistent and reliable service to the user. Such delivery through mobile applications is a significant challenge, however, as it requires the coordination of a range of key components in the end-to-end mobile ecosystem. More particularly, the components of the ecosystem, including, for example, the mobile device, a mobile network, and an application server, may exhibit significant variations in their behavior.

In order to ensure reliability, a mobile application may therefore need to be tested against each or all of the variations exhibited by these components. In general, device variation may be addressed through device diversity testing, while application servers are subjected to load and performance testing. However, the network component is harder to address, as it may include many factors outside the control of the application, such as network connectivity, bandwidth, and network congestion.

A key requirement of application performance is to be resilient to such external and environmental disturbances, which, consequently, imposes a need for testing in all possible network conditions. Such testing can be done by means of network simulation, network emulation, live network testing, or a combination thereof. While simulation offers significant benefits in controllability of the network environment, network simulation is ultimately a best-guess or approximation of live network conditions, and may fail to account for the full extent of non-deterministic network behavior. In addition, live testing, which is testing carried out in an actual live network environment, as its name indicates, does present test-cases that closely approximate real-world use cases, but the reproducibility of test-cases is problematic, given the lack of controllability over the network environment.

In contrast, the emulation approach charts a middle path between these two scenarios. In the context of testing wireless applications, the real application runs on the actual device. The network stack, on the actual emulator device, is also real. Given this setup, network behavior may be controlled by the emulator, which decides what packets the wireless mobile device sends and receives.

Mere repetition of a test case supported by a network emulator, however, may not serve to ensure test result repeatability due to the fact that test cases of a statistical nature may create a variety of different and unpredictable network events, such as a random packet drop, when executed at different points of time, thus leading to different test results.

Accordingly, there is a need for a network emulator mechanism whereby an ability to emulate network conditions and reproduce recorded test results at any point of time is preserved while accounting for a variation in incoming traffic and random network events.

SUMMARY

Embodiments of the present invention include a computer implemented method for replication of a test case in a network environment. The method describes comprising monitoring network traffic in a first instance of the test case by a network emulator node emplaced in the network environment, wherein the network emulator node comprises a processor and a processor readable memory, and network traffic comprises one or more data packets transmitted to the network emulator node by one or more remote nodes. Monitoring further comprises recording a time at which a connection open at the network emulator node completes a communication task, and deriving an order of task completion for each extant open connection thereby and detecting the occurrence of one or more events, wherein the one or more events are selected from a group consisting of a packet drop, a packet retransmission, a packet delay, a packet duplication, packet reordering, a change in the connection's IP address, and a disruption in a radio link associated with the network emulator node. The method additionally comprises recording the nature of the event and identification information associated with the packet to which the event is detected to have occurred, and associating the one or more events with each of the packets monitored, on the basis of the identification information and event recording.

In an additional embodiment, a system for replication of a test case in a network environment is described, the system comprising a network emulator node operable to connect to a network, the network emulator node comprising a processor and a processor readable memory and wherein the network emulator node is adapted to monitor network traffic in a first instance of the test case, wherein network traffic comprises one or more data packets transmitted to the network emulator node by one or more remote nodes, and the monitoring by the network emulator node further comprises recording a time at which a connection open at the network emulator node completes a communication task, deriving an order of task completion for each extant open connection thereby, and detecting the occurrence of one or more events, wherein the one or more events are selected from a group consisting of a packet drop, a packet retransmission, a packet delay, a packet duplication, packet reordering, a change in the connection's IP address, and a disruption in a radio link associated with the network emulator node. The system additionally records the nature of the event and identification information associated with the packet to which the event is detected to have occurred; and associates the one or more events with each of the packets monitored, on the basis of the identification information and event recording.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for the replication of test results in a network environment are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

Exemplary Computing Environment

Figure 1:
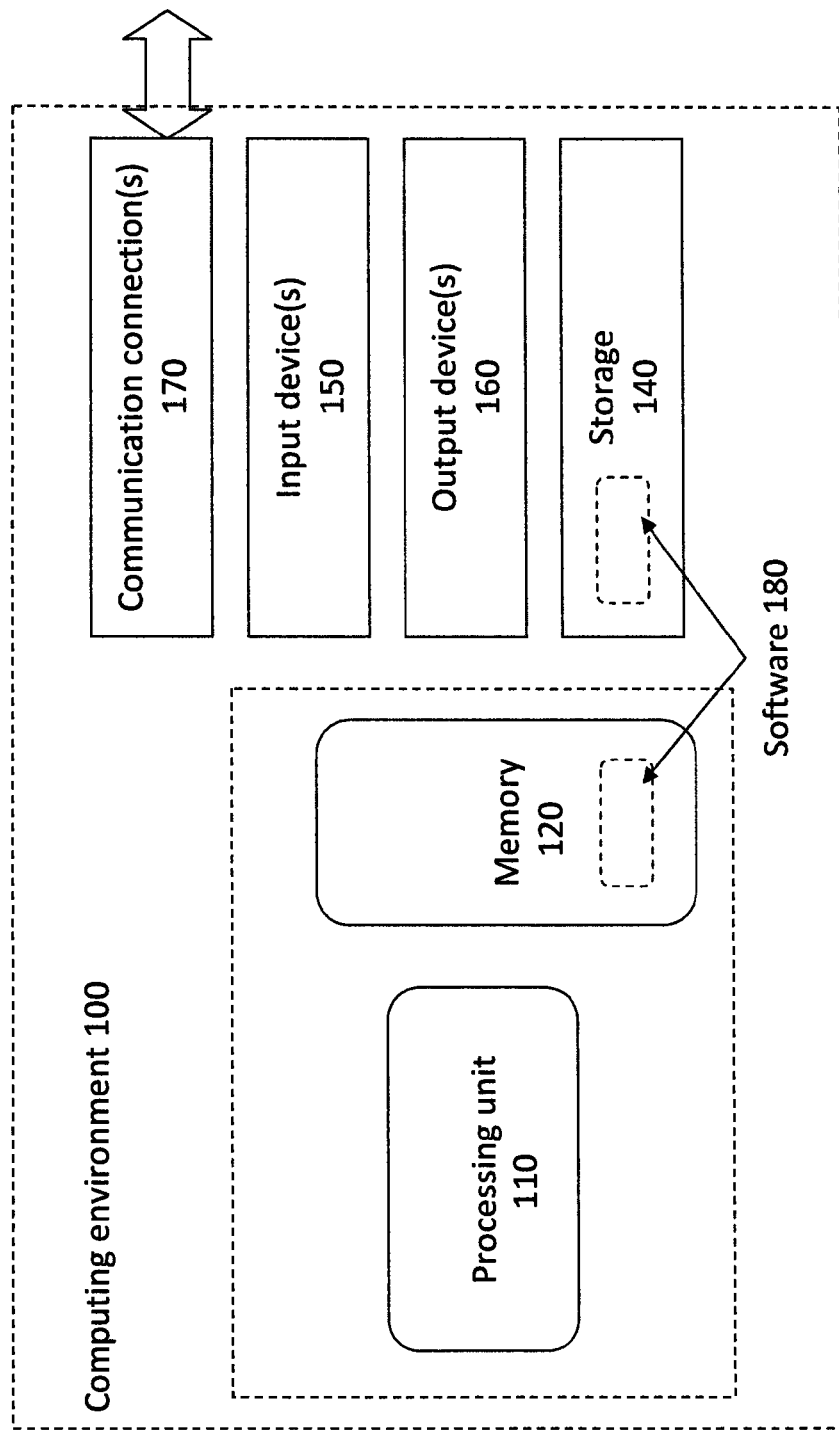
FIG. 1 is an illustration of an exemplary computing environment for the execution of a method for replication of a test case over a network environment.

One or more of the above-described techniques may be implemented in or involve one or more computer systems. FIG. 1 illustrates a generalized example of a computing environment 100. The computing environment 100 is not intended to suggest any limitation as to scope of use or functionality of described embodiments.

With reference to FIG. 1, the computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Exemplary Architecture of a Network Emulator Node

Figure 2:
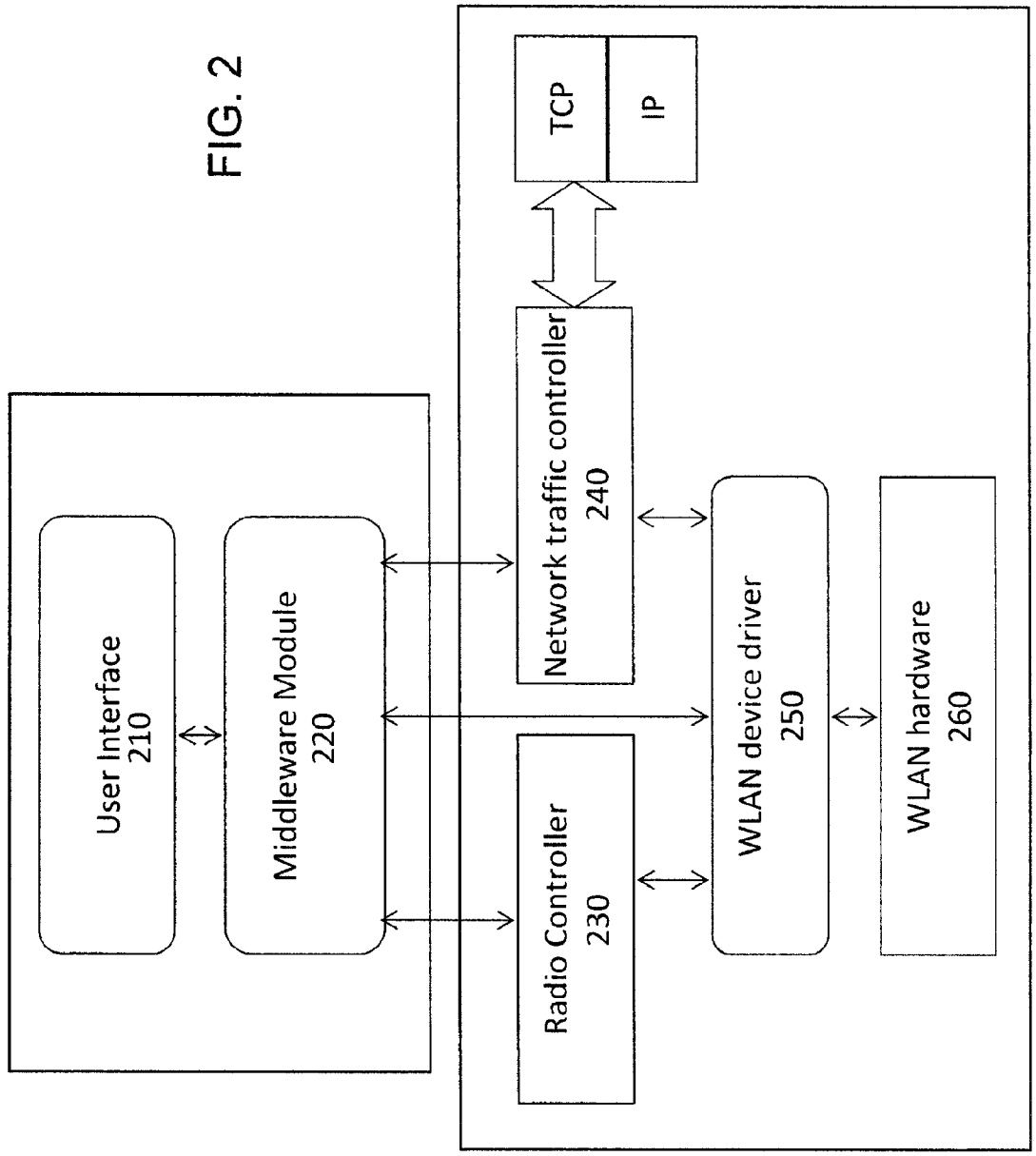
FIG. 2 is an illustration of the architecture of an exemplary network emulator node, in accordance with at least one embodiment of the invention.

As in FIG. 2, and in accordance with some embodiments of the invention, an exemplary network emulator node may consist of a user interface, 210, and a middleware module 220. The user interface module may be a computing device, such as a laptop, or a desktop computer, or a smartphone, or a tablet device. The middleware module 220 may include software configured in accordance with one or more embodiments of the invention. The network emulator node may additionally comprise a radio controller 230, and a network traffic controller 240. The middleware module may be programmed to interface between the radio and network controller and the user interface 210. For example, the network traffic controller may be configured by input received at the user interface 210 by means of the middleware module 230. The network traffic controller 240 may be further configured to manage, prioritize, control or reduce incoming or outgoing network traffic, including, as in an exemplary embodiment, network traffic that utilizes the TCP/IP network protocol. The network emulator node may additionally comprise WLAN hardware 260 and a WLAN device driver 250 configured to drive the WLAN hardware. The device driver 250 may be responsive to the middleware 220.

Exemplary Network Environment

Figure 3:
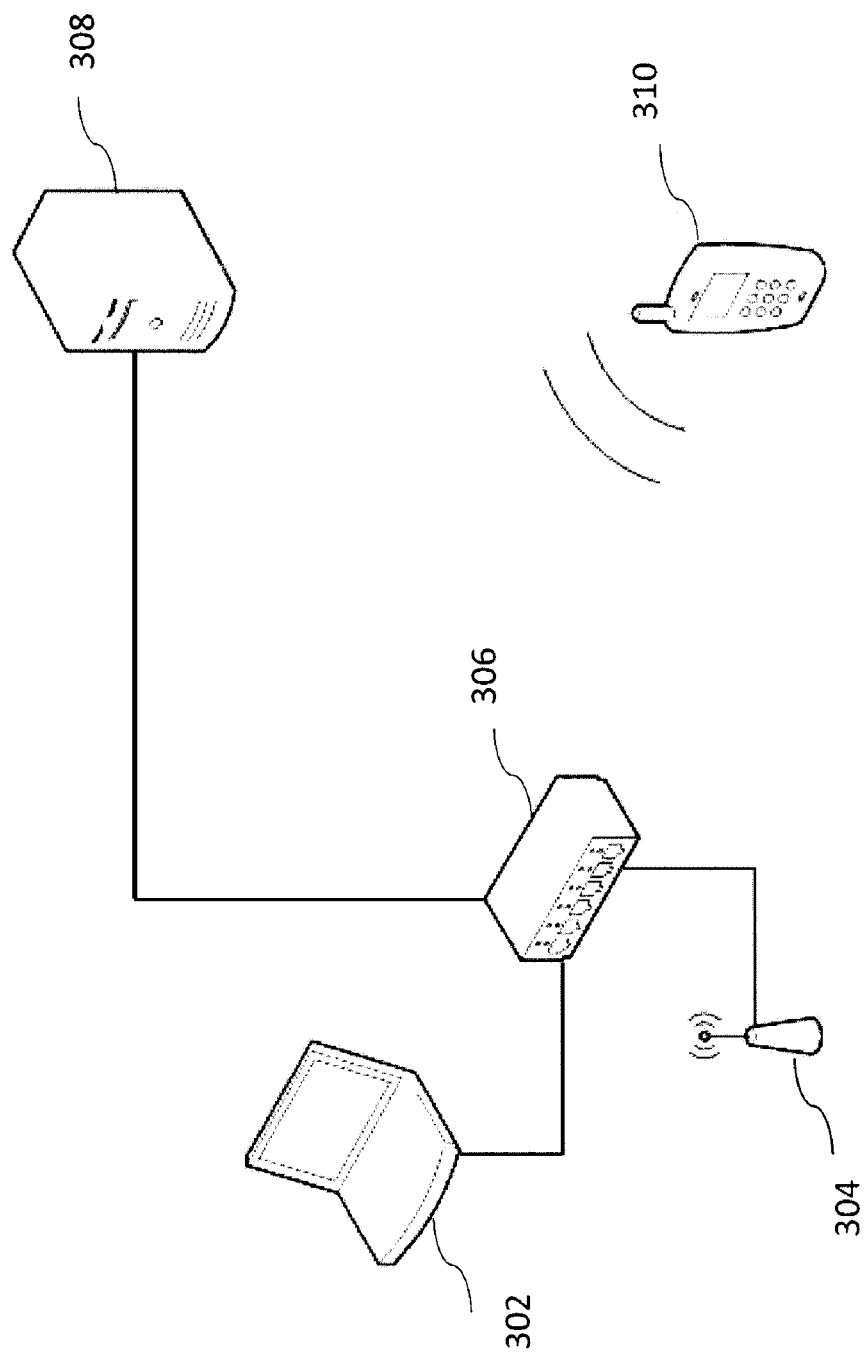
FIG. 3 is an illustration of an exemplary network architecture involved in the replication of a test case, in accordance with an embodiment.

An exemplary network environment in accordance with some embodiments of the invention is depicted in FIG. 3. A client device running an application, depicted in 310 as a mobile client, may connect to a server 308 through a network emulator node 306, the network emulator node 306 operably connected to a Wi-Fi access point 304, and a computing device 302 configured to provide a user interface for the network emulator node 306. In some embodiments, Wi-Fi connectivity may be integrated into the network emulator node by means of, for example, wireless LAN cards, thereby allowing the network emulator node 306 to operate as a Wi-Fi access point itself. Additionally, client devices represented by 310 may not, as in some embodiments of the invention, be limited to a mobile device, and may include any computing device comprising a processor and a processor readable memory. While the client 310 may connect to the network emulator node 306 by means of a direct wireless network connection, in some embodiments of the invention, the client device 310 may connect to the network emulator node 306 by means of a wired network connection, or through an intermediary network, such as the internet.

In accordance with an embodiment, the client device 310 may be authenticated by the device driver WLAN layer 250 in the network emulator node. When the client 310 sends a request to the network emulator node 306, the network traffic controller 240 and the radio controller 230 induces network variations, i.e. in order to emulate a target network, in the traffic or signal flowing from the client to the server 308.

Replication of Test Results

Figure 4:
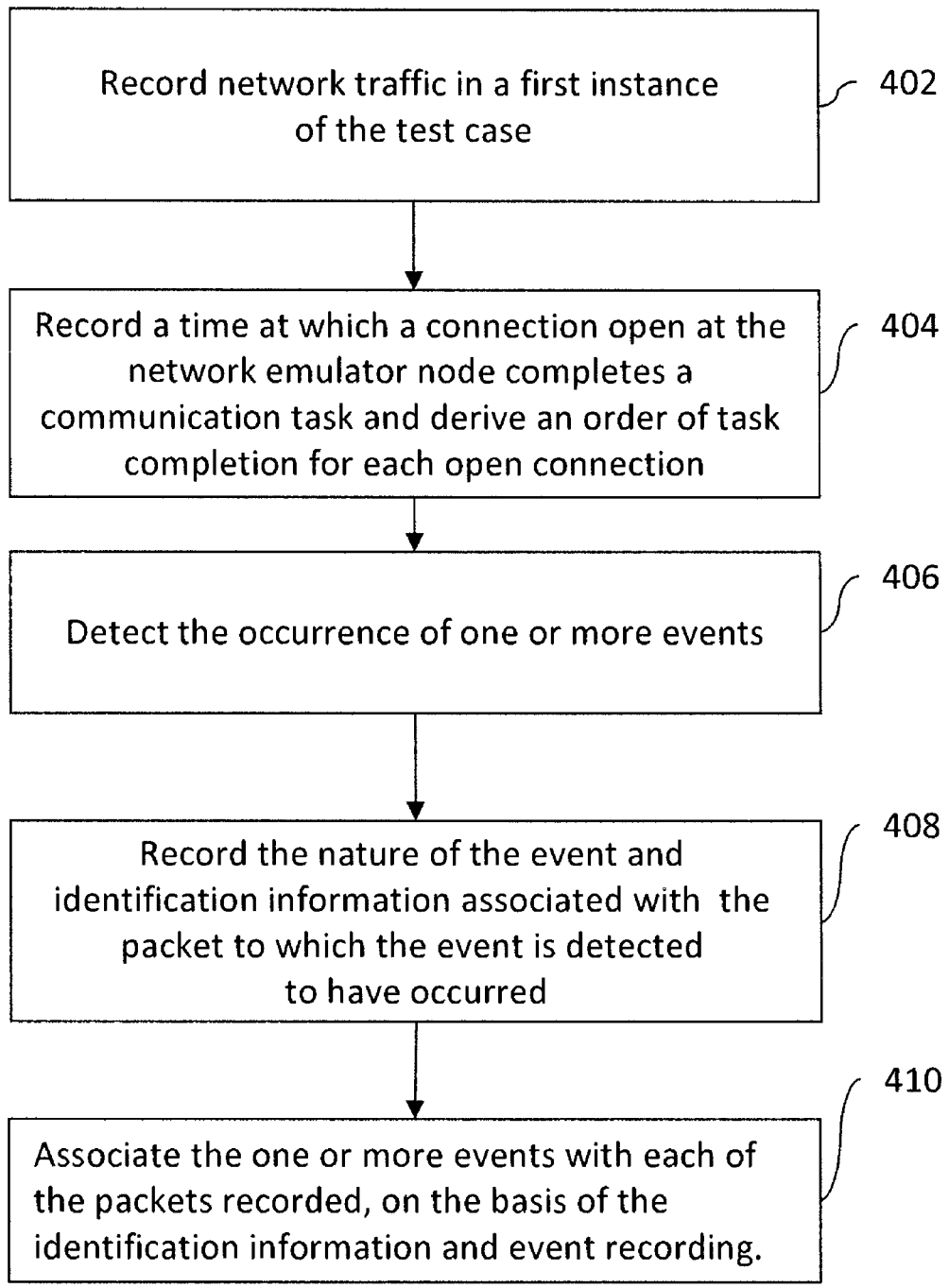
FIG. 4 is an illustrative flow diagram of a method for a method of replication of test results in a network environment.

The replication of test results requires an exact reproduction of network events that occur in application traffic. To that end, steps in the replication of test results, by means of a network emulator node, in a network environment are described by means of FIG. 4. A first step described by block 402, includes the monitoring of network traffic in a first instance of the test case. The network emulator may record application traffic in a monitoring or pass through mode in order to collect information about the nature of network traffic. Information may be collected and collated across different points of time by repeatedly or intermittently repeating a traffic monitoring function. In some embodiments, information may be collected by means of repeating the test case and collated across different points of time across the repeated test cases. Information collected from such monitoring may include firstly, the number of connections, categorized by or based on ports or port numbers. Secondly, the size of packets sent by the application across the network. Third, an invariant portion of the packet content sent by the application, which, in turn, may be recorded through the time variant monitoring and data collection. Fourth, identifying differentiating parts across content in the packets sent.

Then, as in a block 404, a time at which a connection open at the network emulator node completes a communication task is recorded and an order of task completion is consequently derived for open connections thereby. More specifically, the timing relationship between connections or the time at which connections are initialized and terminated is recorded. Learning connection behavior or, more specifically, learning how existing connections are used by the application for sending and receiving data is useful in replicating the merging and splitting of connections.

Then, as in a block 406, the occurrence of one or more network events is detected. Such detection may be predicated upon maintenance of the monitoring step 402. The detection may be implemented by means of a session based recording of one or more of packet drops in the network, an on/off state of the wireless radio, variation in the network bandwidth, and the recording of packet duplication. For each session, a packet sequence number, a packet length, a packet flag and a packet event are recorded. Recorded events may be stored in file in a processor readable memory at the network emulator node for a user to replay at a later point of time.

Then, as in a step 408, the nature of the network event and identification information associated with the packet to which the event is detected to have occurred is recorded. Input identification may be performed by mapping incoming traffic sessions to corresponding sessions in recorded data. If the incoming traffic is encrypted, such mapping may be based on determining a timing relationship between socket connections, from the step 404, and additionally take into consideration a port number of the connections, the packet size information of the traffic flow recorded in the step 402, and user input. If incoming traffic is unencrypted, input identification may similarly be performed by mapping incoming traffic sessions to corresponding sessions in recorded data, where mapping, in this case, includes determining a timing relationship between socket connections, from the step 404, and additionally takes into consideration some or all of a port number of the connections, the packet size information of the traffic flow recorded in the step 402, user input, and the invariant content information as detailed in the input monitoring and recording step, 402.

Then, as in a step 410, one or more events are associated with the monitored packets, the event association on the basis of the identification information and the recorded events. Once sessions are identified and associated with corresponding sessions in recorded data, network events may be applied on incoming traffic based on the events recorded.

If, in the second test case where the test results are to be replicated, packets do not arrive in the same order as in the first recorded test case, a sequence number and a packet count number may be used to uniquely identify and map packets in incoming traffic to the recorded data. The packet count number is determined relative to the temporal position of the packet counting from the start of the application traffic, and the sequence number so used is a measure of bytes passed before the arrival of the packet at the network emulator node. In some embodiments, if incoming traffic utilizes the transmission control protocol (TCP), the sequence number in the TCP header may be used instead.

In some embodiments, there may be a significant deviation in the input traffic in the second test case, while still necessitating reproduction of test results from the first test case. Such deviation between incoming traffic and recorded data from the first test case may require additional steps that include detection of the exact nature and extent of the deviation, and correction thereto by the network emulator node.

Detection scenarios of deviation between incoming traffic and recorded data may include instances where the incoming traffic's packet size is not equal to the corresponding recorded packet size, and, as well, instances where the sum of consecutive packet sizes are not equal to the recorded packet size. Additional aberrations may include a variation in the number of time a packet has been retransmitted in the repeat test case from the recorded test case. In another example, an application may stop sending data prematurely, in comparison with the recorded test case. Event detection and mapping mechanisms explained in steps 402-410 above may then be applied in order to account for such deviation in the test results.

In some embodiments, once an input deviation is detected, the network emulator node may alert a user and ask to rerun the test case. In some embodiments, once a deviation is detected, the detection of the deviation may be conveyed to an end user by means of a display.

In some embodiments, packets traffic utilizing certain specific protocols may lack a sequence number. For example, UDP based traffic may not carry sequence numbers, rendering event recording based on a sequence number inapplicable. In such instances, the sequence number may be constructed based on the following information:

Firstly, detecting whether any protocol above the UDP layer is utilized in the network for handling packet retransmission. To do this, a packet may be dropped by the network emulator node and the traffic monitored for a reoccurrence of the same packet in future communication. If such retransmission capability is not supported in the network, then the network emulator node may simply tag a sequence number to a packet.

If a higher layer protocol is detected that supports retransmission, then the retransmission window size, i.e. the number of packets that may be transmitted before an acknowledgement is received, is determined. The retransmission window size can be estimated by the network emulator node by dropping or holding packets and measuring how many packets are sent without retransmission or complete stoppage of data transfer. Dropping or holding packets at different points of time during a network session may thereby allow the network emulator node to arrive at an estimate of window size.

Secondly, identification of the retransmitted packet. Packet identification is a key part of test case replication and for protocols such as the UDP, a checksum field and a packet size is used to detect and map packets across test cases. Based on the retransmission window size, the network emulator node may determine the depth of backward surveillance of packet traffic to determine whether one or more received packets have been retransmitted, or not.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A method for replication of test results in a network environment, the method comprising:
    recording, by a network management computing device, a test case comprising a plurality of communication tasks over a plurality of network connections and involving network traffic comprising one or more data packets, one or more state changes associated with the one or more data packets, and a time of communication task completion for each of the plurality of communication tasks;
    determining, by the network management computing device, an order of communication task completion based on the recorded time of communication task completion for each of the plurality of communication tasks;
    detecting, by the network management computing device, one or more network events based on the state changes associated with the one or more data packets, the state changes comprising a packet drop, a packet retransmission, a packet delay, a packet duplication, packet reordering, a change in the connection's IP address, or a disruption in a radio link;
    determining, by the network management computing device, a network event type for each of the detected one or more network events based on identification information associated with the one or more data packets for which the state changes are detected, wherein the identification information comprises input identification data based on the order of communication task completion; and
    associating, by the network management computing device, the detected one or more network events with each one of the one or more data packets based on the identification information.

2. The method as set forth in claim 1, wherein the identification information further comprises a connection protocol, a packet count number, a sequence number of the packet, a size of the packet or a port number to which the packet is addressed, wherein the packet count number is relative to the temporal position of the packet counting from the start of the network traffic, and the sequence number comprises a measure of bytes passed before the arrival of the packet.

3. The method as set forth in claim 1, wherein the completion of each one of the plurality of communication tasks is triggered based on satisfying at least one of a connection closure condition or a connection idling condition wherein the connection is in an idle state for longer than a predefined threshold time.

4. The method as set forth in claim 1, further comprising:
    replicating, by the network management computing device, the network traffic in a second test case, wherein the replicating further comprises applying the one or more events to the one or more data packets associated with each of the detected one or more networks events.

5. The method as set forth in claim 4, further comprising:
    detecting, by the network management computing device, a deviation in the network traffic in the second test case from the recorded network traffic.

6. The method as set forth in claim 4, further comprising:
    mapping, by the network management computing device, one or more data packets in the second test case to one or more data packets in the recorded network traffic; and
    applying, by the network management computing device, the one or more network events to the mapped one or more data packets in the second test case.

7. The method as set forth in claim 4, further comprising:
    selecting, by the network management computing device, at least one of the one or more data packets in the second test case for the application of one or more network events by establishing a relationship between the one or more data packets in the second test case and at least one corresponding data packet of the one or more data packets in the recorded network traffic.

8. A network management computing device comprising:
    a processor;
    a memory coupled to the processor which is configured to be capable of executing programmed instructions comprising and stored in the memory to:
        record a test case comprising a plurality of communications tasks over a plurality of network connections and involving network traffic comprising one or more data packets, one or more state changes associated with the one or more data packets, and a time of communication task completion for each of the plurality of communication tasks;
        determine an order of communication task completion based on the recorded time of communication task completion for each of the plurality of communication tasks;
        detect one or more network events based on the state changes associated with the one or more data packets, the state changes comprising a packet drop, a packet retransmission, a packet delay, a packet duplication, packet reordering, a change in the connection's IP address, or a disruption in a radio link;

determine a network event type for each of the detected one or more network events, based on identification information associated with the one or more data packets for which the state changes are detected, wherein the identification information comprises input identification data based on the order of communication task completion; and associate the detected one or more network events with each one of the one or more data packets based on the identification information.

9. The device as set forth in claim 8, wherein the identification information further comprises a connection protocol, a packet count number, a sequence number of the packet, a size of the packet or a port number to which the packet is addressed, wherein the packet count number is relative to the temporal position of the packet counting from the start of the network traffic, and the sequence number comprises a measure of bytes passed before the arrival of the packet.

10. The device as set forth in claim 8, wherein the completion of each one of the plurality of communication tasks is triggered based on satisfying at least one of a connection closure condition or a connection idling condition wherein the connection is in an idle state for longer than a predefined threshold time.

11. The device as set forth in claim 8, wherein the processor is further configured to be capable of executing programmed instructions comprising and stored in the memory to:

replicate the network traffic in a second test case, wherein the replicating further comprises applying the detected one or more events to one or more data packets associated with each of the one or more events recorded.

12. The device as set forth in claim 11, wherein the processor is further configured to be capable of executing programmed instructions comprising and stored in the memory to:

detect a deviation in the network traffic in the second test case from the recorded network traffic.

13. The device as set forth in claim 11, wherein the processor is further configured to be capable of executing programmed instructions comprising and stored in the memory to:

map one or more data packets in the second test case to one or more data packets in the recorded network traffic; and apply the one or more network events to the mapped one or more data packets in the second test case.

14. The device as set forth in claim 11, wherein one or more packets are the processor is further configured to be capable of executing programmed instructions comprising and stored in the memory to:

select at least one of the one or more data packets in the second test case for the application of one or more network events by establishing a relationship between the one or more data packets in the second test case and at least one corresponding data packet of the one or more data packets in the recorded network traffic.

15. A non-transitory computer readable medium having stored thereon instructions for replication of test results in a network environment comprising machine executable code which when executed by at least one processor, causes the processor to perform steps comprising:

recording a test case comprising a plurality of communication tasks over a plurality of network connections and involving network traffic comprising one or more data packets, one or more state changes associated with the one or more data packets, and a time of communication task completion for each of the plurality of communication tasks;

determining an order of communication task completion based on the recorded time of communication task completion for each of the plurality of communication tasks;

detecting one or more network events based on the state changes associated with the one or more data packets, the state changes comprising a packet drop, a packet retransmission, a packet delay, a packet duplication, packet reordering, a change in the connection's IP address, or a disruption in a radio link;

determining a network event type for each of the detected one or more network events based on identification information associated with the one or more data packets for which the state changes are detected, wherein the identification information comprises input identification data based on the order of communication task completion; and associating the detected one or more network events with each one of the one or more data packets based on the identification information.

16. The medium as set forth in claim 15, wherein the identification information further comprises a connection protocol, a packet count number, a sequence number of the packet, a size of the packet or a port number to which the packet is addressed, wherein the packet count number is relative to the temporal position of the packet counting from the start of the network traffic, and the sequence number comprises a measure of bytes passed before the arrival of the packet.

17. The medium as set forth in claim 15, wherein the completion of each one of the plurality of communication tasks is triggered based on satisfying at least one of a connection closure condition or a connection idling condition wherein the connection is in an idle state for longer than a predefined threshold time.

18. The medium as set forth in claim 15, further having stored thereon instructions that when executed by the processor cause the processor to perform steps further comprising:

replicating the network traffic in a second test case, wherein the replicating further comprises applying the detected one or more events to the one or more data packets associated with each of the one or more events.

19. The medium as set forth in claim 18, further having stored thereon instructions that when executed by the processor cause the processor to perform steps further comprising:

detecting a deviation in the network traffic in the second test case from the recorded network traffic.

20. The medium as set forth in claim 18, further having stored thereon instructions that when executed by the processor cause the processor to perform steps further comprising:

mapping one or more data packets in the second test case to the one or more data packets in the recorded network traffic; and applying the one or more network events to the mapped one or more data packets in the second test case.

21. The medium as set forth in claim 18, further having stored thereon instructions that when executed by the processor cause the processor to perform steps further comprising:

selecting at least one of the one or more data packets in the second test case for the application of one or more network events by establishing a relationship between the one or more data packets in the second test case and at least one corresponding data packet of the one or more data packets in the recorded network traffic.

* * * * *